March 31, 1942.  W. C. STARKEY ET AL  2,277,795
OVER-RUNNING CLUTCH CONSTRUCTION
Filed Jan. 27, 1941
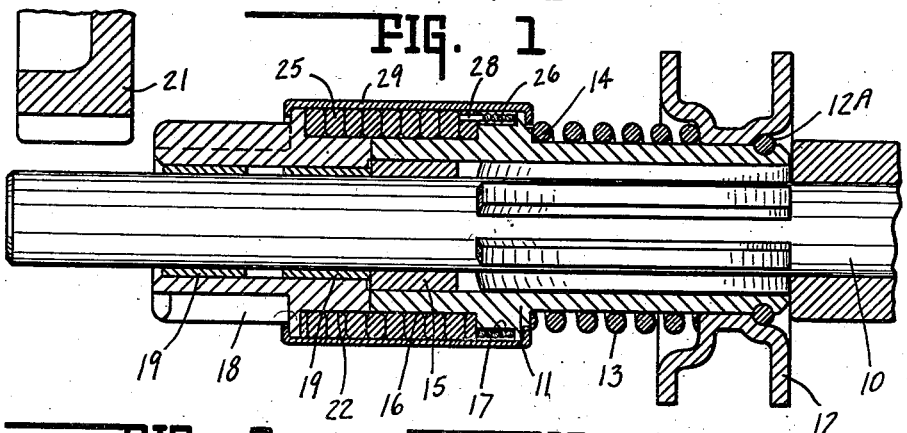
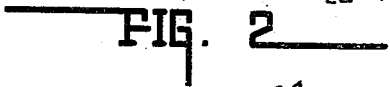
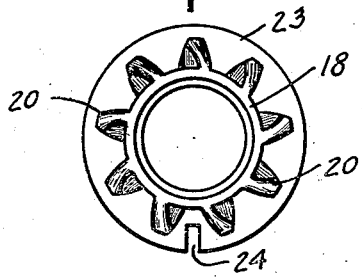
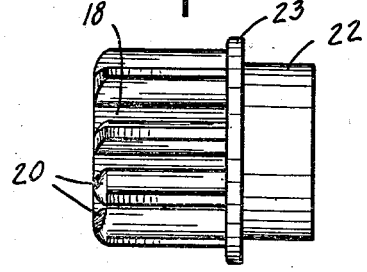
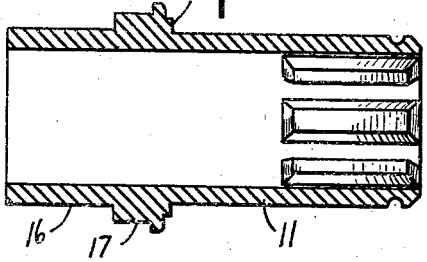
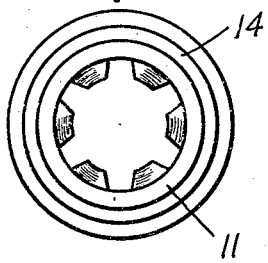
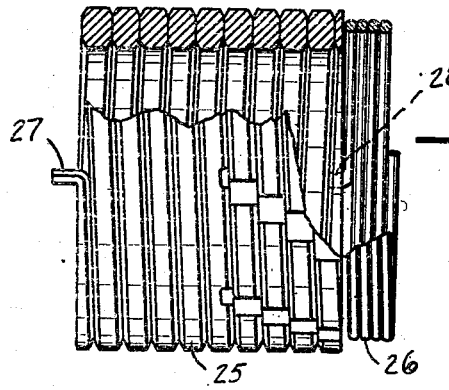
INVENTORS.
WILLIAM C. STARKEY.
MAURICE H. MILLER,
BY Lockwood, Goldsmith & Galt.
ATTORNEYS.

Patented Mar. 31, 1942

2,277,795

UNITED STATES PATENT OFFICE 2,277,795

OVERRUNNING CLUTCH CONSTRUCTION

William C. Starkey, Indianapolis, and Maurice H. Miller, Beech Grove, Ind., assignors to L. G. S. Spring Clutches, Incorporated, Indianapolis, Ind., a corporation Application January 27, 1941, Serial No. 376,016

6 Claims. (Cl. 192—42)

This invention relates to an over-running clutch construction particularly adapted for starters for automobile engines and other types of high speed prime movers. However, said construction is useful in other fields as well.

In starter drives for modern high speed internal combustion engines, it is important that the clutch should permit immediate and free over-running as soon as the engine starts under its own power. The gear ratio between the starting motor and the engine proper is necessarily large so that the rotor of the starter motor, if driven by the engine through the starter clutch, may rotate at an excessively high and dangerous speed. Said rotor has little or no frictional load so a slight frictional drag in the clutch is sufficient to turn the motor at a speed corresponding to the speed of the engine.

In the present invention, the helical spring type of over-running clutch is used between the starter motor and the engine. This type of clutch gives an excellent positive drive from the starting motor to the engine but is subject to a slight frictional drag when the engine starts and its speed increases to the point where over-running takes place. While this frictional drag is less than with other types of clutches now in use, still it is sufficient to create a dangerous condition in some cases where the operator is late in withdrawing the starter pinion.

In the helical spring type clutch one end of the spring is anchored to a driven or driving member and the opposite end is provided with an internal or external clutching surface adapted to mate with a clutch surface on the other of said members. Ordinarily the unstressed diameter of the spring is such that there is a slight frictional engagement between said clutch surface. When the driving member is rotated in the proper direction, this frictional engagement causes the spring to expand or contract to bring said clutch surfaces into closer engagement for transmitting torque to the driven member. When the driven member becomes the driving member and rotates at a higher speed than the original driving member, the frictional engagement reverses the expansion or contraction of the spring and relieves the clutching pressure to permit over-running. In over-running the change of diameter due to the frictional engagement is not sufficient to relieve the frictional drag entirely and one object of the present invention is to insure that said frictional drag is completely relieved, or relieved to a greater extent than has heretofore been possible.

In the present invention, the clutch spring is provided with an internal clutching surface mating with an external clutching surface on the driving or driven member. A part or all of the clutch spring is made sufficiently flexible to be expansively stressed under centrifugal action when a predetermined rotating speed is reached. By this means the spring may completely leave the clutching surface at a predetermined speed within the safe operating range of the starting motor. The over-running action of the clutch is therefore completely free and there is no frictional drag which might overspeed the starter motor. At speeds less than that sufficient to cause the spring to fly free of its mating clutch surface, the frictional drag is considerably relieved.

Other objects and features of the invention will be understood from the accompanying drawing and the following description and claims:

Fig. 1 is a sectional view through a clutch construction built in accordance with a preferred form of the invention. Fig. 2 is an end view of the same. Fig. 3 is an elevational view of a pinion member which serves as the driven member in the construction of Fig. 1. Fig. 4 is a sectional view of the driving member. Fig. 5 is an end view of the same. Fig. 6 is an elevational view partly in section of the clutch spring.

Referring now to Fig. 1, there is shown therein a shaft 10 which may be the rotor shaft of an electric motor used for starting an internal combustion engine. Said shaft has splined thereto a driving member 11 on the outer surface of which there is slidably mounted a flanged clutch collar 12. A compression spring 13 surrounds the driving member 11 and abuts against a shoulder 14 formed thereon and against the clutch collar 12. A snap ring 12A engaged in a suitable groove in the driving member 11 retains the collar 12 thereon against the action of the spring 13. An alignment bushing 15 is pressed into the bore of the driving member and rides freely on the shaft 10. The driving member 11 is provided with an external clutch surface 16 and an external clutch surface 17 of larger diameter.

A driven member 18 is freely mounted on the shaft 10 and is provided with internal anti-friction bushings 19 preferably formed of graphite impregnated bronze. The driven member 18 is provided with a plurality of teeth 20 adapted to mate with corresponding teeth formed on the periphery of a member 21 which may be the flywheel of the engine to be started. The driven member 18 is provided with an external clutch surface 22 terminating in a flange 23 having a notch 24 at one point in its periphery.

Referring now to Fig. 6, there is provided a helically wound clutch spring consisting of a main torque transmitting portion 25 and an auxiliary actuating portion 26. The portion 25 is formed of relatively heavy wire and is wound with an unstressed internal diameter substantially the same as that of the clutch surface 22 but slightly greater than that of the clutch surface 16. This portion of the spring may thus fit snugly over the clutch surface 22 on the driven member but normally runs freely over the clutch surface 16 of the driving member when assembled as shown in Fig. 1. Preferably the clearance between the internal surface of the spring portion 25 and the clutch surface 16 is on the order of .005" but may be considerably varied to suit individual conditions. The end coil of the spring portion 25 is provided with an outwardly turned ear 27 adapted to engage the notch 24 to provide positive anchorage of the spring to the driven member 18.

The actuating portion 26 of the spring is formed of relatively light and flexible wire and is provided with an outwardly turned ear 28 engaging a suitable recess in the last coil of the spring portion 25 and providing a positive connection between the two spring portions. The actuating portion 26 is wound in the same direction as the winding of the main portion 25 and is provided with an unstressed internal diameter somewhat less than that of the clutch surface 17 on the driving member 11. The difference in diameter is preferably from .010" to .030" but may be varied as found necessary.

In the assembled structure, the main spring portion 25 surrounds the clutch surfaces 22 and 16 and the actuating portion 26 engages the clutch surface 17. An outer cylindrical casing 29 is placed over the springs and the ends thereof are inturned to loosely engage the flanges 14 and 23. One of said ends may be inturned prior to assembly but the turning of the other end is an assembly operation. The inner diameter of the casing 29 is such as to be free of the spring portion 26 at all times and to be free of the actuating portion 26 when said portion has been stressed to cover the clutch surface 17. Said casing 29 thus serves to prevent unnecessarily great expansion of either spring portion which might cause sufficient flexure to give a permanent set but does not interfere with normal operation.

In the operation of the apparatus, the clutch collar 12 is moved to the left, referring to Fig. 1, by any well known form of apparatus not shown. At the same time the starting motor is started and the shaft 10 is caused to rotate. The movement of the collar 12 is transmitted through the spring 13 to the driving member 11 and driven member 18 to provide resilient engagement of the teeth 20 with the teeth of the flywheel 21. The rotation of the shaft 10 is imparted to the driving member 11 through the splined connection of these two members and is imparted by frictional engagement to the actuating portion 26 of the clutch spring. This rotation is in proper direction to cause the portion 26 to wrap down on the clutch surface 17 and to engage the same with sufficient clutching force to exert a contracting action on the main portion 25 of the spring. The contraction of the main portion 25 brings the same into engagement with the rotating clutch surface 16 and the consequent frictional action of said surface on the internal clutch surface of said spring causes the same to wrap down more tightly on said clutch surface and on the clutch surface 22 to transmit the necessary driving torque to the driven member 18.

As soon as the engine has started under its own power, rotation of the flywheel 21 at a higher speed than that corresponding to the normal speed of the shaft 10 causes the member 18 to tend to drive the member 11 and exerts an unwinding action on both portions of the clutch spring. This unwinding action relieves the clutching pressure but does not relieve the normal frictional drag of spring portion 26 on the clutch surface 17. Since the normal internal diameter of the spring 25 is greater than that of the clutch surface 16, said spring exerts no frictional drag on said clutch surface. A further increase in speed of the engine while the teeth of the driven member 18 are still engaged with the teeth of the flywheel tends to cause the shaft 10 and the rotor of the starting motor to travel at greater than normal speed. However, the flexibility of the auxiliary portion 26 of the spring is such that it is expansively stressed by centrifugal action to relieve the frictional drag and before an unsafe speed is reached, said spring flies outwardly against the casing 29. In so doing, it completely leaves the clutch surface 17 and the frictional drag of said spring on said clutch surface is completely eliminated. Thus dangerous over-speeding of the starter motor is prevented even though the operator may keep his foot on the starter pedal and at the same time operate the throttle to over-speed the engine.

The invention has been described in one of its preferred forms, the details of which may be varied without departing from the scope of the invention as defined by the appended claims.

The invention claimed is:

1. An over-running clutch construction including a driving member, a driven member, said members being coaxially rotatable, and a helical clutch spring construction having a portion of greater flexibility than the remainder thereof, one of said members having external clutch surfaces and the less flexible portion of the spring construction having one end anchored to the other of said members and having an internal clutch surface adapted to mate with a portion of said external clutch surface, the unstressed diameter of said internal clutch surface being greater than that of its mating clutch surface, the more flexible portion of said spring having an internal clutch surface mating with another portion of said external clutch surface and having an unstressed diameter less than that of its mating clutch surface, and the more flexible portion of said spring being sufficiently flexible to fly free of its mating clutch surface when rotated at a predetermined speed.

2. An over-running clutch construction including a driving member, a driven member, said members being coaxially rotatable and one of said members having external clutch surfaces, a main torque transmitting helical clutch spring having one end anchored to the other of said members and its free end provided with an internal clutch surface mating with a portion of said external clutch surface and having an unstressed internal diameter slightly greater than that of its mating clutch surface, and a similarly wound helical actuating spring having one end connected to said main clutch spring for applying an actuating force thereto and having an internal clutch surface mating with another portion of said external clutch surface and having an unstressed diameter less than that of its mating clutch surface, said actuating spring having greater flexibility than that of said main clutch spring and being adapted to fly free of its mating clutch surface by centrifugal action when rotated at greater than a predetermined speed.

3. An over-running clutch construction including a driving member, a driven member, said members being coaxially rotatable, and a helical clutch spring construction having a portion of greater flexibility than the remainder thereof, one of said members having external clutch surfaces and the less flexible portion of said spring construction having one end anchored to the other of said members and having an internal clutch surface adapted to mate with a portion of said external clutch surface, the unstressed diameter of said internal clutch surface being greater than that of its mating clutch surface, the more flexible portion of said spring having an internal clutch surface mating with another portion of said external clutch surface and having an unstressed diameter less than that of its mating clutch surface, and the more flexible portion of said spring being sufficiently flexible so as to be expansively stressed by centrifugal action to relieve the frictional drag thereof on its mating clutch surface when rotated at a speed higher than the normal operating speed of one of said members.

4. An over-running clutch construction including a driving member, a driven member, said members being coaxially rotatable and one of said members having external clutch surfaces, a main torque transmitting helical clutch spring having one end anchored to the other of said members and its free end provided with an internal clutch surface mating with a portion of said external clutch surface and having an unstressed internal diameter slightly greater than that of its mating clutch surface, and a similarly wound helical actuating spring having one end connected to said main clutch spring for applying an actuating force thereto and having an internal clutch surface mating with another portion of said external clutch surface and having an unstressed diameter less than that of its mating clutch surface, said actuating spring having greater flexibility than that of said main clutch spring and being adapted to be expansively stressed by centrifugal action to relieve the frictional drag thereof on its mating clutch surface when rotated at a speed higher than the normal operating speed of one of said members.

5. An over-running clutch construction including a driving member, a driven member, said members being coaxially rotatable, a helical clutch spring construction having a portion of greater flexibility than the remainder thereof, one of said members having external clutch surfaces and the less flexible portion of said spring construction having one end anchored to the other of said members and having an internal clutch surface adapted to mate with a portion of said external clutch surface, the unstressed diameter of said internal clutch surface being greater than that of its mating clutch surface, the more flexible portion of said spring having another portion of said internal clutch surface mating with an external clutch surface and having an unstressed diameter less than that of its mating clutch surface, and the more flexible portion of said spring being sufficiently flexible to fly free of its mating clutch surface when rotated at a speed greater than the normal operating speed of one of said members.

6. An over-running clutch construction including a driving member, a driven member, said members being coaxially rotatable and one of said members having external clutch surfaces, and a main torque transmitting helical clutch spring having one end anchored to the other of said members and its free end provided with an internal clutch surface mating with a portion of said external clutch surface and having an unstressed internal diameter slightly greater than that of its mating clutch surface, and a similarly wound helical actuating spring having one end connected to said main clutch spring for applying an actuating force thereto and having an internal clutch surface mating with another portion of said external clutch surface and having an unstressed diameter less than that of its mating clutch surface, said actuating spring having greater flexibility than that of said main clutch spring and being adapted to fly free of its mating clutch surface by centrifugal action when rotated at a speed greater than the normal operating speed of one of said members.

WILLIAM C. STARKEY.
MAURICE H. MILLER.